United States Patent [19]
Abe

[11] 3,939,890
[45] Feb. 24, 1976

[54] WIDE BASE TYPE PNEUMATIC TIRE FOR CONSTRUCTION VEHICLE

[75] Inventor: Masaru Abe, Sayama, Japan

[73] Assignee: Bridgestone Tire Company, Ltd., Kyoba, Japan

[22] Filed: Apr. 21, 1975

[21] Appl. No.: 570,148

[30] Foreign Application Priority Data
Apr. 23, 1974 Japan.............................. 49-45029

[52] U.S. Cl. ............................ 152/209 B; 152/354
[51] Int. Cl.² ..................... B60C 11/04; B60C 9/04
[58] Field of Search ........ 152/209 R, 209 B, 330 R, 152/354

[56] References Cited
UNITED STATES PATENTS
2,971,552  2/1961  Williams et al. ................ 152/209 B
3,457,981  7/1969  Verdier ........................... 152/209 B
3,786,848  1/1974  Brown et al. .................... 152/209 B

*Primary Examiner*—Drayton E. Hoffman
*Attorney, Agent, or Firm*—Sughrue, Rothwell, Mion, Zinn & Macpeak

[57] ABSTRACT

A wide base type pneumatic tire for construction vehicle has a given sectional thickness distribution of crown portion, a tread pattern of lug arrangement and a crown radius of at least 75% of overall tire width, and is usable for dump truck, earth mover and the like.

8 Claims, 9 Drawing Figures

— Tire A (Present Invention)
---- Tire B (Prior Art)

FIG_1a

— Tire A (Present Invention)
---- Tire B (Prior Art)

FIG_1b

— Tire A (Present Invention)
---- Tire C (Prior Art)

FIG_3a

Tire A

FIG_3b

Tires B,C

FIG_4a

Tire A

FIG_4b

Tires B,C

FIG_5

WIDE BASE TYPE PNEUMATIC TIRE FOR CONSTRUCTION VEHICLE

The present invention relates to pneumatic tires and more particularly to wide base type pneumatic tires for construction vehicle which are advantageously usable for dump trucks, earth movers such as scraper and the like.

In the tires of this type, operating conditions are considerably severe because the load per tire is usually large and running is effected on off-road including sharp-edged stones, macadams and the like. Fortunately, these tires have been used at low speed rather.

Recently, however, tires for said earth movers are intended to operate at high speed in association with improvement of working efficiency and high-performance or large-sized and high-speed ability of vehicles owing to the increase of personal expenses and the like. As a result, troubles due to the heat build-up of tire are conspicuous remarkably.

In general, the wide base type tires have such merits that the outer diameter can be reduced at the same load capacity as compared with that of regular type tires, that the stability is good because the tire width is wide and the rigidity is large, and that the floating force and tractive force are high because the ground contact area is large and the ground contact pressure is low. However, in order to hold these merits and to obtain a desired wear resistance, these tires are necessary to have crown width and radius above certain extents.

In order to satisfy such requirements, it has hitherto been designed to gradually thicken the sectional thickness of the tire from the crown center to the shoulder portion; that is, the thickness of the shoulder portion is considerably large as compared with that of the crown center. Therefore, the sectional thickness of the shoulder portion must be larger (for example, 1.2 times) in case of the wide base type tire than that of the regular type tire. As a result, the wide base type tire is liable to evolute a significant amount of heat and is forced to reduce a value of ton-miles-per-hour rating (hereinafter abbreviated to TMPH rating) by about 25% as compared with that of the regular type tire.

An object of the invention is to provide wide base type tires having less heat evolution, i.e. a thermal durability without sacrificing a wear life of tire even if said tire is used at high speed under heavy load. In other words, the invention aims at the prevention of local heat build-up by wholly suppressing the heat evolution and uniformizing the temperature distribution of tire while maintaining wear life.

The present invention lies in a wide base type pneumatic tire for construction vehicle comprising a crown portion and a shoulder, said tire having such a sectional thickness distribution that a thickness at a middle point between crown center and shoulder is 0.95–1.08 times and a thickness at the shoulder is 1.00–1.30 times on the basis of the thickness of the crown center measured at meridional section of tire, said crown portion having at its surface a tread pattern forming a lug arrangement as a whole, the width of said lug measured along the circumferential direction of tire being 2.0–2.2 times at the crown center area and 1.25–1.35 times at the shoulder area with respect to a width of a groove between the lugs measured along the circumferential direction of tire, and the radius of said crown portion being not less than 75% of the overall tire width under normal inflation pressure.

According to a preferred embodiment of the invention, the crown portion is composed of tread rubber having a resilience of not less than 60%.

According to another preferred embodiment of the invention, a plurality of auxiliary channels are provided on either side of the tread at a position corresponding to 30–38% of the tread width from the crown center in the circumferential direction of tire as a whole, and have a depth corresponding to 30–60% of the groove depth and a width corresponding to 1.5–4.5% of the tread width.

The invention will now be described in greater detail with reference to the accompanying drawings, wherein:

FIGS. 42 and 4b are diagrammatical plan views showing tread patterns of FIGS. 3a and 3b after a half of wear life, respectively;

Figure 1A:
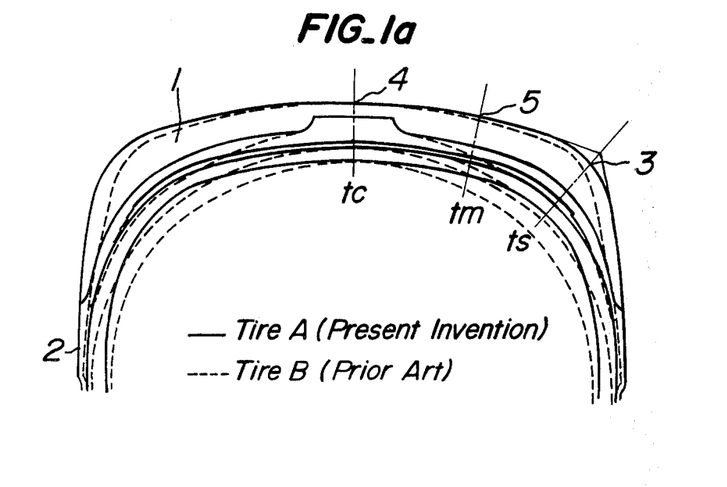
FIGS. 1a and 1b are diagrammatically cross-sectional views showing a comparison of wide base type tire of the invention with conventional tires at meridional section, respectively.
Figure 1B:
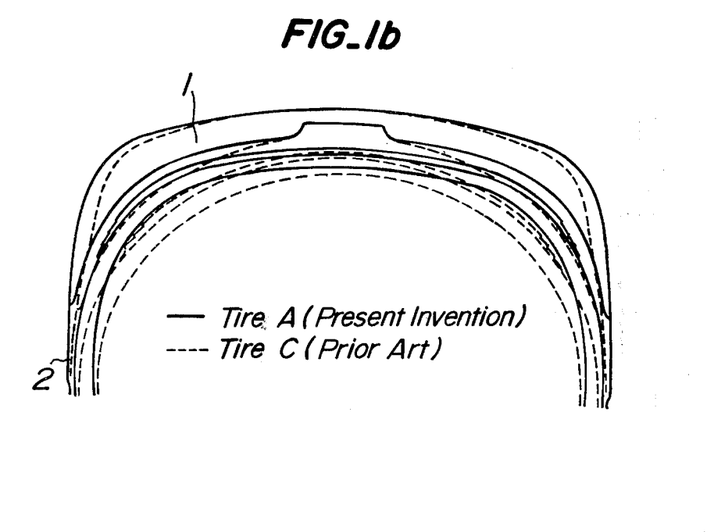

The meridional section of the wide base type pneumatic tire according to the invention is shown by a solid line in FIGS. 1a and 1b, while that of the conventional tires is shown by a dotted line in the same figures. In this figure, 1 respresnts a crown portion, 2 a sidewall, 3 a shoulder, 4 a crown center, and 5 a middle point between the crown center and the shoulder. The term "shoulder" used herein means an intersection of the tread surface and a perpendicular line drawn from an intersection of an extending line of the crown portion and an extending line of outer surface of the sidewall to the tread surface.

The crown portion 1 has a sectional thickness distribution shown by the following equation:
$$tc : tm : ts = 1 : 0.95\text{--}1.08 : 1.00\text{--}1.30$$
wherein $tc$ represents a sectional thickness of the crown center 4 including a thickness of tread rubber and a thickness of carcass, $tm$ represents a thickness of the middle point 5 and $ts$ represents a thickness of the shoulder 3. The preferred sectional thickness distribution is as follows:
$$tc : tm : ts = 1 : 1.00\text{--}1.06 : 1.00\text{--}1.25$$
The term "sectional thickness" used herein means a thickness extending from the tread surface to the inner surface of the carcass measured along the perpendicular line drawn from the tread surface to an interface between the tread and the carcass ply.

The crown portion 1 is composed of low-heat evoluting tread rubbers, particularly a tread rubber having a resilience of not less than 60%. The resilience is generally a standard with respect to the heat evoluting property of tire rubber.

Further, the crown portion 1 has at its surface a tread pattern forming a lug arrangement 6 as a whole in conformity with the principle of such a wide base type tire.

Figure 3A:
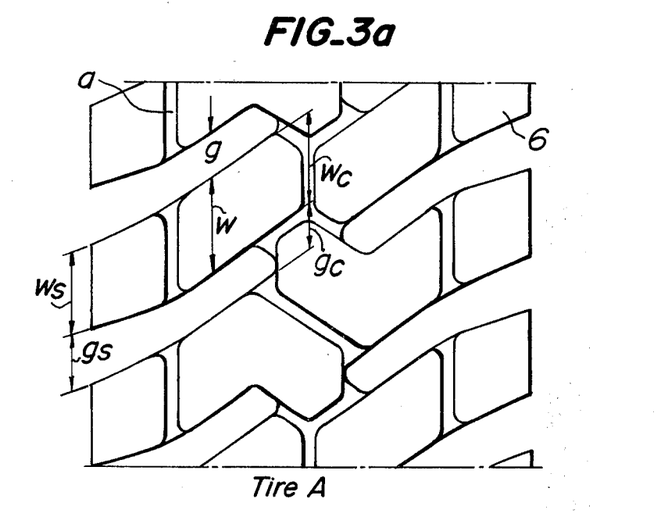
FIGS. 3a and 3b are diagrammatical plan views showing tread patterns of wide base type tires of the invention and the prior art, respectively.

As shoown in FIG. 3a, the width w of the lug 6 taken along the circumferential direction of tire has the following expressions at the crown center area and the shoulder area based on a width of a groove g between the lugs, respectively.

$w_c = (2.0–2.2) g_c$
$w_s = (1.25–1.35) g_s$

A plurality of auxiliary channels a are provided on either side of the crown portion at a position correponding to 30–38% of the tread width from the crown center so as to intersect with the groove g and to substantially extend in the circumferential direction of tire, and have a depth corresponding to 30–60% of the groove depth and a width of 10-30mm corresponding to 1.5-4.5% of the tread width.

Furthermore, the crown portion 1 has a radius corresponding to not less than 75% of the overall tire width under normal inflation pressure.

As mentioned above, it is necessary to ensure the crown width and radius of the tire above certain extents in order to provide a desired wear life. For this purpose, it has been designed to make the sectional thickness of the shoulder portion large in the prior art. Accoding to the invention, a required crown radius is ensured and the sectional thickness of the shoulder portion is restrained as small as possible by applying a so-called concave molding method wherein the shoulder has a diameter larger than that of the crown center in the mold.

In the tire of the invention, the ratio of the width between bead portions (rim width) to the overall tire width is 0.75–0.90 and the ratio of sectional height of tire measured from the bead base to the overall tire width (aspect ratio) is 0.75–0.93 when the tire is left to stand at room temperature under normal inflation pressure for 24 hours. By such limitations, the increase of TMPH rating value can be achieved as described on the following example.

The structure of the carcass according to the invention is not particularly restricted, but when a bias structure is used, an angle of cord arrangement with respect to the rotation axis of tire (cord angle) is very important.

That is, there is a close relation between the cord angle and the tire shape in case of the bias structure.

When the tire having a certain cord angle is filled with air of inflation pressure, the carcass possesses a fundamental property intending to take a certain shape through "balance of force". Such equilibriumed shape is usually called as "natural shape". This natural shape is dynamically introduced assuming that the tire is very thin shell, and is approximately completely coincident with the tire shape in the practical tires for passenger car and is sufficiently coincident with the tire shape for truck and bus within the practical range.

In case of tires for construction vehicle (hereinafter referred to as OR tire), since the thickness cannot be considered as the thin shell, the inner stress is large and the natural shape is not always taken. However, these tires have a strong tendency of approaching to the natural shape. Therefore, in order to obtain the aspect ratio (ratio of sectional height to overall width in tire) within the aforesaid range, it is naturally necessary to make the cord angle to a certain range. In the wide base type tire of the invention, the cord angle is generally 50° to 60°, preferably 53° to 57° (average value of overall plies) with respect to the rotation axis perpendicular to the circumferential direction of tire.

When the cord angle exceeds 60°, the aspect ratio varies under normal inflation pressure, so that there are caused problems in tire dimension, and the breaking strength of carcass, spring constant and other properties are deteriorated, and further there is a problem in the manufacture of the tire.

According to the invention, in order to lower the heat build-up of the tire, there is used low-heat evoluting rubber as a tread, an effectiveness of which is well-known. In addition to the heat build-up, properties such as wear resistance, cut resistance and the like are required for the tread rubber. However, it is very difficult that properties required in large-sized OR tires for the earth mover are satisfied only by practical rubber compoundings and optimum design cannot be obtained.

At first, the inventor aims at such a point that the temperature distribution is uniformized so as to prevent the heat build-up at locally particular positions.

For this purpose, the sectional thickness distribution from tread center to ends thereof is substantially uniform or is thinned toward the ends. On the other hand, it is desirable to make the crown radius as large as possible in view of the maintenance of wear life.

If it is intended to simply accomplish both the above mentioned facts, the crown radius in the mold is sufficiently large, but the sectional thickness distribution is substantially uniform from the crown center 4 to the shoulder 3 or is thinned toward the shoulder 3, so that the rigidity of the shoulder portion is relatively insufficient. Further, when the resulting tire is filled with air of normal inflation pressure (for example, 3.15 kg/cm$^2$), the crown radius becomes small undersirably as compared with that before filling with air, so that tires having bad wear life are only obtained.

In order to restrain the change of the crown radius before and after filling with air as small as possible, it is necessary that the sectional thickness of the shoulder portion is thickened to a certain extent in view of rigidity distribution.

Therefore, it is important to optimize the sectional thickness distribution of the crown portion.

According to the invention, the optimum sectional thickness distribution of the crown portion is such that the thickness at the middle point between the crown center and the shoulder is 0.95–1.08 times and the thickness of the shoulder is 1.00–1.30 times on the basis of the sectional thickness of the crown center as mentioned above, whereby a best result can be obtained.

In the tire of the invention, the sectional thickness near the shoulder is thinner than that of the conventional tire if the sectional thickness of the crown center in both the tires is the same. Preferably, this may be advantageously accomplished by adjusting the depth of the groove without changing the case thickness and skid base rubber thickness.

In order to obtain tires having high-speed performance and durability against heavy load for vehicles such as earth mover, only the sectional thickness distribution as mentioned above is still insufficient. Therefore, the inventor further attempted an improvement of tread pattern to organically be combined with the said sectional thickness distribution.

This is, according to the invention, the tread pattern fundamentally follows lug arrangement in accordance with the conventional OR tires and is particularly constructed as follow in order to suppress the heat evolution due to the sectional thickness of the shoulder portion.

1. The width of lug is large at the crown center area and becomes small gradually toward the shoulder; in other words, the width of groove between the lugs is diverged toward the shoulder, whereby the temperature reduction due to heat radiation near the shoulder portion, where is apt to cause heat build-up, is particularly attempted.

In order to accomplish this attempt effectively, it is necessary that the ratio of the width of the groove to the width of the lug is 1 : 2.0–2.2 at the crown center area and 1 : 1.25–1.35 at the shoulder area (measured along the circumferential direction of tire) because the lug must have a width enough to provide the effective ground contact area in order to maintain the wear life.

2. A plurality of auxiliary channels $a$ for heat radiation are provided on both sides of the crown portion at a position corresponding to 30–38% of the tread width from the crown center in the circumferential direction of tire.

When the channel is inside the position of 30%, the temperature distribution becomes ununiform, while when the channel is outside the position of 38%, there is caused a fear of coming off the outer part of the lug and the movement of such a part becomes large, whereby the heat build-up is promoted.

Furthermore, the depth and width of the auxiliary channel $a$ are critical.

That is, the depth of the auxiliary channel $a$ is 30–60% of the depth of the groove between the lugs at the position of the channel. When the depth is less than 30%, the effect of heat radiation is poor, while when the depth is more than 60%, the outer part of the lug acts as a block and the movement thereof becomes large in accordance with use conditions, so that the heat build-up is promoted rather.

Next, the width of the auxiliary channel $a$ at meridional section of tire is 1.5–4.5% of the tread width. Further, such a width must be 10–30mm as an absolute value (independent of tire dimension) in view of prevention of catching stones. Similarly, an angle between the side wall of the auxiliary channel and the line perpendicular to the tread surface is 10°–20° in view of prevention of catching stones.

According to the invention, it is essential that the crown radius is at least 75% of the overall tire width under normal inflation pressure so as not to sacrifice the wear resistance of the tire.

The invention will be described in detail with reference to the following example.

Three kinds of tires, i.e. tire A of the invention and tires B and C of the prior arts were provided each having a tire size of 33.25-35 inclusive of a body ply consisting of 18 layers of 1,260 $d/2$ nylon cords and a breaker consisting of 4 layers of 1,260 $d/2$ nylon cords.

Figure 2:
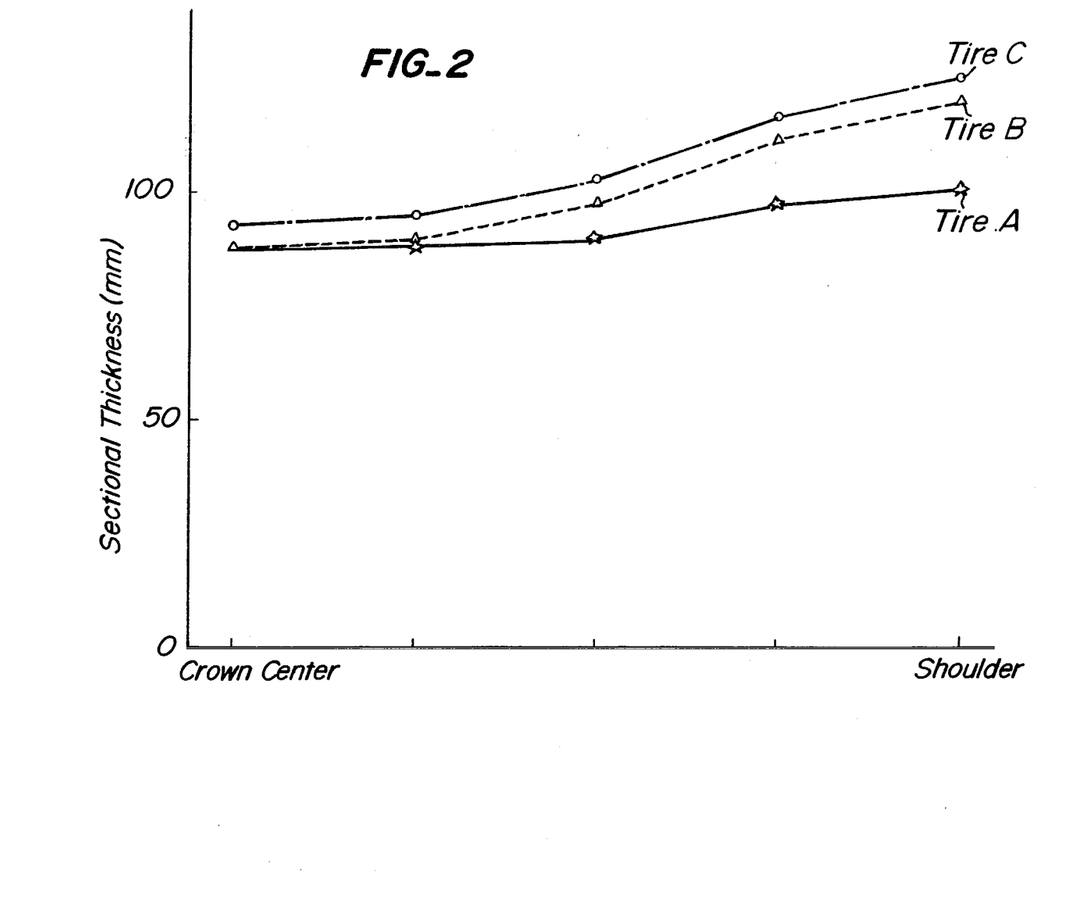
FIG. 2 is a graph showing a sectional thickness distribution at meridional section of tire.

FIGS. 1a and 1b show meridional sections of tires A, B and C, particularly crown portions in molds when compairing the tire A with the tire B or C, respectively. FIG. 2 shows a sectional thickness distribution at meridional section in tires A, B and C. In each tire, property and compound recipe of tread rubber are as follows.

|  | Tire A | Tire B | Tire C |
|---|---|---|---|
| Resilience | 60% | 50% | 50% |
| Main compounding | | | |

-continued

|  | Tire A | Tire B | Tire C |
|---|---|---|---|
| recipe | mainly NR | NR/SBR | NR/SBR |

The sectional thickness at any position of the crown portion as shown in FIG. 2 is as follows on millimeter unit.

|  |  | Each of quarter points between crown center and shoulder | | | |
|---|---|---|---|---|---|
|  | Crown center | near crown center | middle point | near shoulder | Shoulder |
| Tire A | 88.1 | 89.0 | 90.2 | 97.5 | 101.7 |
| Tire B | 88.1 | 90.0 | 98.2 | 112.0 | 120.7 |
| Tire C | 93.1 | 95.0 | 103.2 | 117.0 | 125.7 |

Accordingly, the sectional thickness distribution at each point of the crown portion is as follows.

|  | Crown center | Middle point | Shoulder |
|---|---|---|---|
| Tire A | 1 | 1.02 | 1.15 |
| Tire B | 1 | 1.11 | 1.37 |
| Tire C | 1 | 1.11 | 1.35 |

Figure 3B:
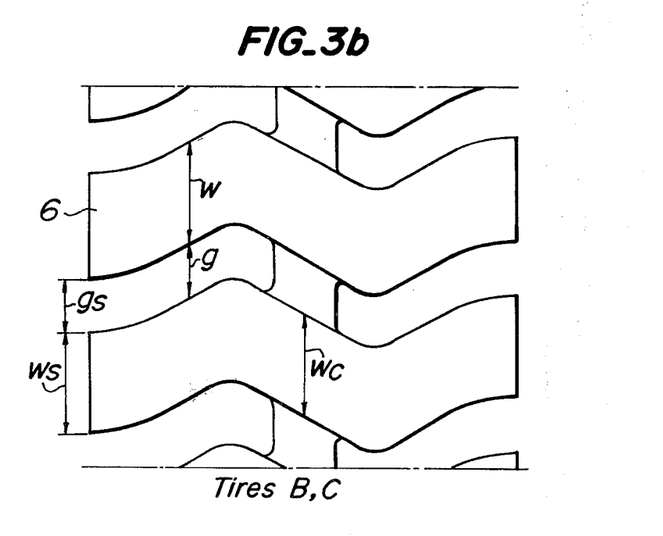
Figure 4A:
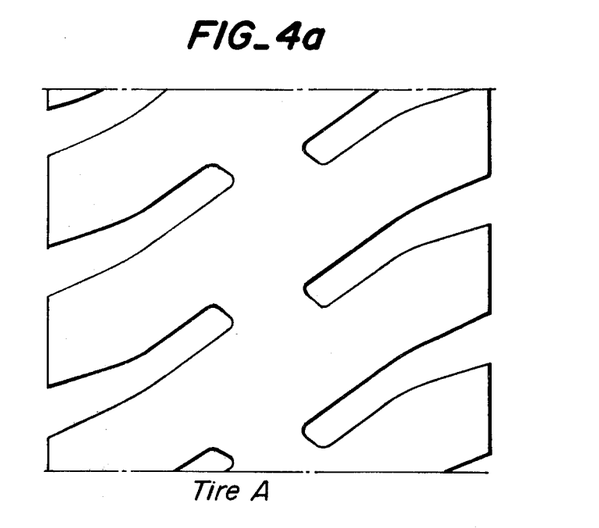
Figure 4B:
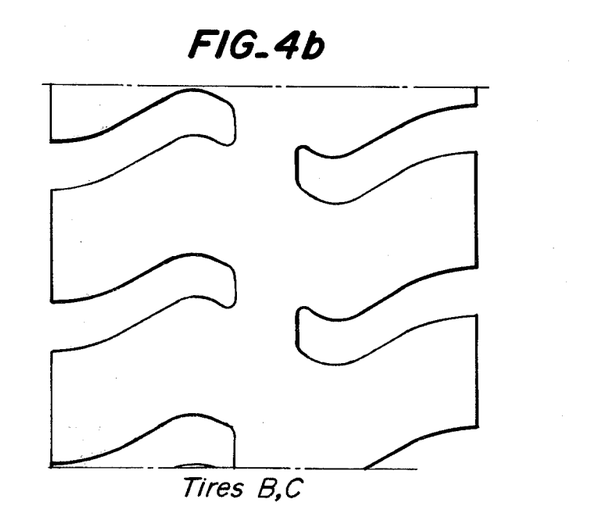

FIGS. 3a and 4a show tread patterns of the tire A before use and after a half of wear life, respectively, while FIGS. 3b and 4b show tread patterns of the tires B and C before use and after a half of wear life, respectively.

Figure 5:
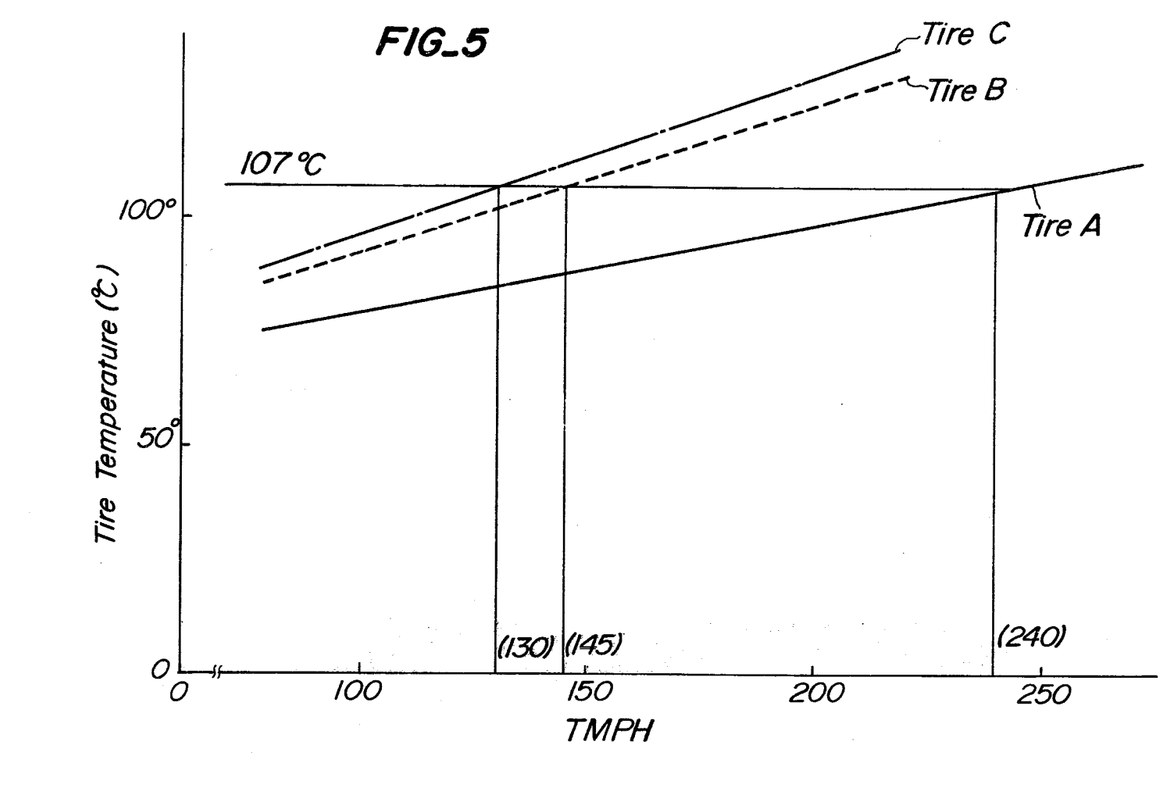
FIG. 5 is a graph showing a relation between tire temperature and TMPH.

Next, these tires were sufficiently run under the following conditions and thereafter the tire temperature above the breaker was measured 3 to 5 times every one hour. This test was repeated at three running speed levels to obtain a result as shown in FIG. 5 when the running condition is expressed as TMPH rating value.

| Test conditions: | |
|---|---|
| Vehicle | CAT. 631 type scraper |
| Road | 6.1 Km cicuit course |
| Tire load | 13,740 Kg |
| Inflation pressure | 3.15 Kg/cm² |

The term "TMPH" used herein means a product of load and speed and has the following technical meaning.

The TMPH is a measure of heat separation depending upon the temperature inside the tire which is one of important factors influencing on the tire life. That is, the value of TMPH when the temperature inside the tire reaches to 107°C (225°F) at an ambient temperature of 38°C (100°F) is called as a TMPH rating value inherent to that tire and estimates a possible working quantity in view of the heat evolution.

Therefore, by the TMPH rating value in the classified tire, the size of that tire can be determined according to the working quantity, and also the allowable load and speed can be calculated when the tire size is defined.

The value of TMPH is calculated by the following equation:

TMPH = Average tire load × Average speed for the day

In the calculation of TMPH, there are adopted the following terms:

Average tire load $$= \frac{1}{2}(\text{"Empty" tire load} + \text{"Loaded" tire load})$$

Average speed $$= \frac{\text{Round trip distance in miles} \times \text{Number of trips}}{\text{Total hours} \begin{pmatrix} \text{from start of first shift} \\ \text{to end of last shift} \end{pmatrix}}$$

Correction act actual ambient temperature $$= \left(38°C - \begin{matrix}\text{Actual ambient}\\\text{temperature}\end{matrix}\right) \times \frac{1}{2} + \text{tire temperature}$$

Each of tires A, B and C was run at three or more TMPH values until the temperature inside the tire is substantially saturated and then the maximum temperature inside the tire at each of TMPH values was graphed as shown in FIG. 5, from which the TMPH rating value at 107°C was read.

As seen from FIG. 5, the conventional tires B and C have TMPH rating values of 145 and 130, respectively, while the tire A of the invention shows a very high rating value of 240 and has an extremely improved load capacity.

This fact shows that the conventional tire C is run only at average speed of 16 Km/h under a certain loaded tire load, while the tire A of the invention can be run at an average speed of 30 Km/h.

Next, the temperature distribution of tire was measured in which the temperature above the breaker was measured at intervals of 25 mm from the crown center to the shoulder under the substantially equal TMPH value with respect to the tires A and B. The thus obtained data are shown in FIG. 6.

Figure 6:
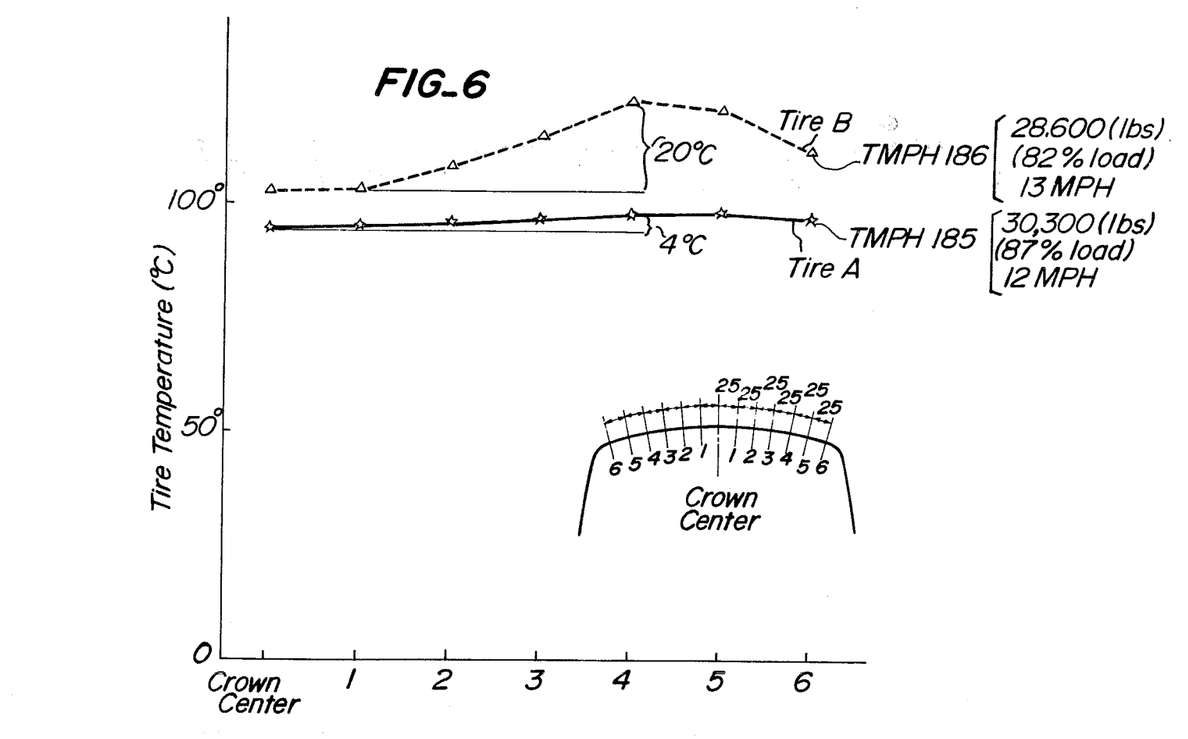
FIG. 6 is a graph showing a tire temperature distribution at various positions of crown portion.

As seen from FIG. 6, the conventional tire B produces a high temperature area of about 120°C near the shoulder, while the tire A of the invention shows only the temperature difference of about 4°C between the crown center and the shoulder and has an approximately uniform temperature distribution.

In connection with wear resistance, it has been found that the tire A of the invention has a wear life corresponding to about 90–95% of that of the conventional tire B.

As mentioned above, the invention makes it possible to run the tire at high speed under severe conditions, particularly heavy load and contributes to enhance the construction working efficiency.

What is claimed is:

1. A wide base type pneumatic tire for construction vehicle comprising a crown portion and a shoulder, said tire having such a sectional thickness distribution that a thickness at a middle point between crown center and shoulder is 0.95–1.08 times and a thickness at said shoulder is 1.00–1.30 times on the basis of the thickness of said crown center measured at meridional section of tire, said crown portion having at its surface a tread pattern forming a lug arrangement as a whole, the width of said lug measured along the circumferential direction of tire being 2.0–2.2 times at the crown center area and 1.25–1.35 times at the shoulder area with respect to a width of a groove between said lugs measured along the circumferential direction of tire, and the radius of said crown portion being not less than 75% of the overall tire width under normal inflation pressure.

2. A wide base type pneumatic tire as claimed in claim 1, wherein said tread pattern further comprises a plurality of auxiliary channels provided on either side of said tread at a position corresponding to 30–38% of the tread width from said crown center in the circumferential direction of tire as a whole, said channel having a depth corresponding to 30–60% of said groove depth and a width corresponding to 1.5–4.5% of said tread width.

3. A wide base type pneumatic tire as claimed in claim 2, wherein said auxiliary channel has a width of 10–30 mm.

4. A wide base type pneumatic tire as claimed in claim 2, wherein in said auxiliary channel an angle between a side wall of the channel and a line perpendicular to the tread surface is 10°–20°.

5. A wide base type pneumatic tire as claimed in claim 1, wherein said crown portion is composed of tread rubber having a resilience of not less than 60%.

6. A wide base type pneumatic tire as claimed in claim 1, wherein said tire has such a sectional thickness distribution that the thickness at said middle point is 1.00–1.06 times and the thickness at said shoulder is 1.00–1.25 times on the basis of the thickness of said crown center measured at meridional section of tire.

7. A wide base type pneumatic tire as claimed in claim 1, wherein said tire has a ratio of a width between bead portions to the overall tire width of 0.75–0.90 and a ratio of a sectional tire height measured from bead base to the overall tire width of 0.75–0.93 under normal inflation pressure.

8. A wide base type pneumatic tire as claimed in claim 1, wherein in said tire is provided carcass cord plies having a cord angle of 50°–60°, preferably 53°–57° with respect to the rotation axis perpendicular to the circumferential direction of tire.

* * * * *